US011060795B2

(12) United States Patent
Lee et al.

(10) Patent No.: US 11,060,795 B2
(45) Date of Patent: Jul. 13, 2021

(54) DOUBLE TUBE FOR HEAT EXCHANGE

(71) Applicant: ContiTech Fluid Korea Co., Ltd, Cheonan-si (KR)

(72) Inventors: Kilnam Lee, Nonsan-si (KR); Steffen Hendrik, Cheonan-si (KR); Jonghoon Cha, Cheonan-si (KR); Jinwon Ko, Cheongju-si (KR); Ji Yeon Lee, Cheonan-si (KR); Hyunjin Im, Cheonan-si (KR); Sunphil Ga, Cheongju-si (KR)

(73) Assignee: ContiTech Fluid Korea Ltd., Cheonan-si (KR)

( * ) Notice: Subject to any disclaimer, the term of this patent is extended or adjusted under 35 U.S.C. 154(b) by 323 days.

(21) Appl. No.: 16/303,632

(22) PCT Filed: May 22, 2017

(86) PCT No.: PCT/KR2017/005296
§ 371 (c)(1),
(2) Date: Nov. 20, 2018

(87) PCT Pub. No.: WO2017/200362
PCT Pub. Date: Nov. 23, 2017

(65) Prior Publication Data
US 2020/0284520 A1    Sep. 10, 2020

(30) Foreign Application Priority Data
May 20, 2016    (KR) .................. 10-2016-0061878

(51) Int. Cl.
*F28D 7/02*        (2006.01)
*F28D 7/10*        (2006.01)
(Continued)

(52) U.S. Cl.
CPC ............ *F28D 7/106* (2013.01); *F16L 41/021* (2013.01); *F28D 7/024* (2013.01); *F28F 1/08* (2013.01);
(Continued)

(58) Field of Classification Search
CPC ........ F28F 1/08; F28F 9/0248; F28F 2210/06; F28F 2265/26; F28D 7/106; F28D 7/024; F16L 41/021
See application file for complete search history.

(56) References Cited

U.S. PATENT DOCUMENTS 6,000,466 A * 12/1999 Aoyagi .................... F28F 1/40
                                                              165/133
9,091,487 B2 * 7/2015 Byon ....................... F28D 7/14
(Continued)

FOREIGN PATENT DOCUMENTS

DE          3206799 A1    11/1982
EP          2156948 A1     2/2010
(Continued)

OTHER PUBLICATIONS

International Search Report of the Korean Intellectual Property Office dated Aug. 2, 2017 for international application PCT/KR2017/005296 on which this application is based.

*Primary Examiner* — Devon Russell
(74) *Attorney, Agent, or Firm* — Gregory Adams; David L. Cate (57) ABSTRACT

The double tube for heat exchange includes: a spiral pipe having ridges and valleys alternately formed on a circumferential surface along a spiral track thereof and guiding a first fluid therethrough; an outer pipe receiving the spiral pipe axially inserted thereinto and guiding a second fluid along the circumferential surface such that the second fluid exchanges heat with the first fluid; a resistance member protruding from the spiral pipe or valleys to increase time of
(Continued)

the second fluid in the valleys and to support the ridges adjacent thereto. Unlike typical double tubes, this double tube can: improve heat exchange efficiency by virtue of the spiral pipe; improve flow directionality of the second fluid; reduce noise through expansion of a space between an end joint of the outer and inner pipe to reduce the pressure of the second fluid; and improve efficiency through resistance members protruding from the valleys.

8 Claims, 8 Drawing Sheets (51) Int. Cl.
   F28F 1/08 (2006.01)
   F28F 9/02 (2006.01)
   F16L 41/02 (2006.01)
(52) U.S. Cl.
   CPC ........ F28F 9/0248 (2013.01); F28F 2210/06 (2013.01); F28F 2265/26 (2013.01)

(56) References Cited

U.S. PATENT DOCUMENTS

| | | | |
|---|---|---|---|
| 2003/0218332 A1* | 11/2003 | Takasaki | F28F 9/02 285/123.3 |
| 2006/0005387 A1* | 1/2006 | Tase | B21C 23/085 29/890.052 |
| 2008/0009564 A1 | 1/2008 | Robert et al. | |
| 2010/0036025 A1 | 2/2010 | Rodgers | |
| 2010/0326640 A1 | 12/2010 | Higashiyama | |
| 2011/0126580 A1* | 6/2011 | Bae | F28D 7/106 62/498 |
| 2013/0025834 A1* | 1/2013 | Choi | F28F 1/426 165/156 |
| 2013/0192804 A1* | 8/2013 | Matsuda | F28F 1/06 165/154 |
| 2014/0109373 A1* | 4/2014 | Nakamura | F25B 40/00 29/428 |
| 2015/0159957 A1* | 6/2015 | Baxi | F28F 13/12 165/109.1 |
| 2015/0168074 A1* | 6/2015 | Bariar | F28F 1/40 165/154 |
| 2015/0240982 A1* | 8/2015 | Eisner | F16L 55/041 166/305.1 |
| 2016/0076682 A1* | 3/2016 | Conrad | B29C 66/52241 285/21.1 |
| 2016/0216045 A1* | 7/2016 | Chan | F28D 7/106 |

FOREIGN PATENT DOCUMENTS

| | | |
|---|---|---|
| JP | H09113155 A | 5/1997 |
| JP | 2012127623 A | 7/2012 |
| KR | 10-2012-0132707 A | 12/2010 |
| KR | 20110104141 A | 9/2011 |
| KR | 10-2012-0007799 A | 1/2012 |
| KR | 10-1415738 B1 | 7/2014 |
| WO | 2009091490 A1 | 7/2009 |
| WO | 2011162771 A1 | 12/2011 |
| WO | 2013176712 A1 | 11/2013 |
| WO | 2017023563 A1 | 2/2017 |

* cited by examiner

DOUBLE TUBE FOR HEAT EXCHANGE

CROSS REFERENCE TO RELATED APPLICATIONS

This application is the national stage of PCT/KR2017/005296, filed May 22, 2017, designating the United States and claiming priority from Korean patent application no. 10-2016-0061878, filed May 20, 2016, the entire contents of which are incorporated herein by reference.

The present disclosure generally relates to a double tube for heat exchange. More particularly, the present disclosure relates to a double tube for heat exchange, which can improve heat exchange efficiency between a second fluid and a first fluid flowing through a spiral pipe axially inserted into an outer pipe to increase a contact area between an outer surface of the spiral pipe and a second fluid flowing between the outer pipe and the spiral pipe; can improve flow directionality of the second fluid through formation of grooves in valleys of the spiral pipe along a spiral track thereof; can reduce flow-induced noise through expansion of a space between an end joint of the outer pipe and an inner pipe to reduce pressure of the second fluid; and can further improve heat exchange efficiency through resistance members protruding from valleys to increase residence time of the second fluid.

BACKGROUND OF THE INVENTION

Generally, a double tube includes an inner pipe and an outer pipe surrounding an outer circumferential surface of the inner pipe to form a flow path between the outer pipe and the inner pipe. Such a double tube allows heat exchange between a first fluid flowing through the inner pipe and a second fluid flowing through the flow path between the inner pipe and the outer pipe.

Thus, the double tube may be used in a liquid supercooling system, which allows a low-temperature and low-pressure refrigerant at an outlet of an evaporator of an automotive air conditioner to exchange heat with a high-temperature and high-pressure refrigerant at an outlet of a condenser of the air conditioner to increase a supercooling degree of a refrigerant entering the evaporator, thereby improving cooling performance of the air conditioner. In such a liquid supercooling system, a refrigerant circulates in order of a compressor→a condenser→an expansion valve→an evaporator→a compressor, and a double tube is employed to allow a refrigerant at an outlet of the evaporator to exchange heat with a refrigerant at an outlet of the condenser (or at an inlet of the evaporator).

As one example of such a double tube, a double tube connection structure is disclosed in Korean Patent Publication No. 10-2012-0007799 A.

A typical double tube for heat exchange has a problem in that the double tube cannot secure a sufficient heat transfer area during flow of the second fluid and thus exhibits poor heat exchange efficiency. In order to overcome this problem, there has been proposed a method in which an inner pipe is formed in a spiral shape to increase a heat transfer area to improve heat exchange efficiency. However, there is a limitation in improvement in heat exchange efficiency by this method.

Therefore, there is a need for an improved double tube.

SUMMARY OF THE INVENTION

It is an object of the disclosure to provide an improved double tube.

Embodiments of the present invention have been conceived to solve such a problem in the art and it is an aspect of the present invention to provide a double tube for heat exchange which includes a spiral pipe axially inserted into an outer pipe to increase residence time of a second fluid inside the outer pipe by virtue of a spiral shape of the spiral pipe, thereby improving heat exchange efficiency.

According to another aspect of the present invention, a double tube for heat exchange is provided which includes at least three grooves, preferably at least four grooves formed on a circumferential surface of a spiral pipe along a spiral track of valleys to improve flow directionality of a second fluid so as to allow the second fluid to flow more stably, thereby further improving heat exchange efficiency.

According to a further aspect of the present invention, a double tube for heat exchange is provided which has increased diameters of joints at both ends of an outer pipe to expand a space between the outer pipe and an inner pipe so as to reduce pressure of a fluid during inflow and outflow of the fluid, thereby reducing flow-induced noise.

According to yet another aspect of the present invention a double tube for heat exchange is provided which includes resistance members protruding from valleys of a spiral pipe to increase residence time of a second fluid, thereby further improving heat exchange efficiency.

According to yet another aspect of the present invention, a double tube for heat exchange is provided which includes resistance members adjacent to ridges of a spiral pipe to prevent warpage of ridges of the spiral pipe, thereby improving durability of a spiral pipe.

In accordance with an aspect of the present invention, a double tube for heat exchange includes: a spiral pipe having ridges and valleys alternately formed on a circumferential surface thereof along a spiral track thereof and guiding a first fluid to flow therethrough; an outer pipe receiving the spiral pipe axially inserted thereinto and guiding a second fluid to flow along the circumferential surface of the spiral pipe in an axial direction such that the second fluid exchanges heat with the first fluid; and a resistance member protruding from the spiral pipe or the valleys to increase residence time of the second fluid in the valleys on the circumferential surface of the spiral pipe and to support the ridges adjacent thereto.

The double tube for heat exchange may further include: inner pipes connected to opposite sides of the spiral pipe to allow the first fluid to flow therethrough; and pipe expansion joints provided at opposite sides of the outer pipe to have a greater diameter than the outer pipe to be placed at junctions of the spiral pipe and the inner pipes, the pipe expansion joints being sealed against the corresponding pipe of the inner pipes and provided with ports for introducing and discharging the second fluid, respectively.

Each of the valleys may have at least three grooves, preferably at least four grooves formed along a spiral track thereof to improve flow directionality of the second fluid and to increase a contact area between the second fluid and the spiral pipe. Resistance members may be at least partially formed over the remaining grooves except for two grooves located outside among the at least three grooves, preferably at least four grooves.

Each of the pipe expansion joints may include pipe expansion portions having a greater diameter than the outer pipe and integrally connected to the outer pipe. The pipe expansion portions may include a first pipe expansion portion and a second pipe expansion portion protruding from the first pipe expansion portion and having a flattened upper surface. The flattened upper surface may be formed by flattening a curved circumferential surface of the pipe expansion portion to create a space expansion portion inside the flattened upper surface and to improve weldability of the ports.

According to an aspect of the present invention, the double tube for heat exchange includes the spiral pipe axially inserted into the outer pipe to increase residence time of a second fluid inside the outer pipe, thereby improving heat exchange efficiency between the second fluid flowing between the outer pipe and the spiral pipe and a first fluid flowing through the spiral pipe.

In addition, according to an aspect of the present invention, the double tube for heat exchange includes at least three grooves, preferably at least four grooves formed on the circumferential surface of the spiral pipe along the spiral track of the valleys to improve flow directionality of the second fluid so as to allow the second fluid to flow more stably, thereby further improving heat exchange efficiency.

Further, according to an aspect of the present invention, the double tube for heat exchange has increased diameters of pipe expansion joints connecting outer pipes to each other to expand a space between the outer pipe and the inner pipe so as to reduce pressure of a fluid during inflow and outflow of the fluid, thereby reducing flow-induced noise.

Furthermore, according to an aspect of the present invention, the double tube for heat exchange can improve durability of a spiral pipe by preventing warpage of ridges of the spiral pipe through the resistance member adjacent to the ridges.

BRIEF DESCRIPTION OF THE DRAWINGS

The invention will now be described with reference to the drawings wherein.

DESCRIPTION OF THE PREFERRED EMBODIMENTS OF THE INVENTION

Hereinafter, embodiments of the present invention will be described in detail with reference to the accompanying drawings. It should be noted that the drawings are not to precise scale and may be exaggerated in thicknesses of lines or sizes of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
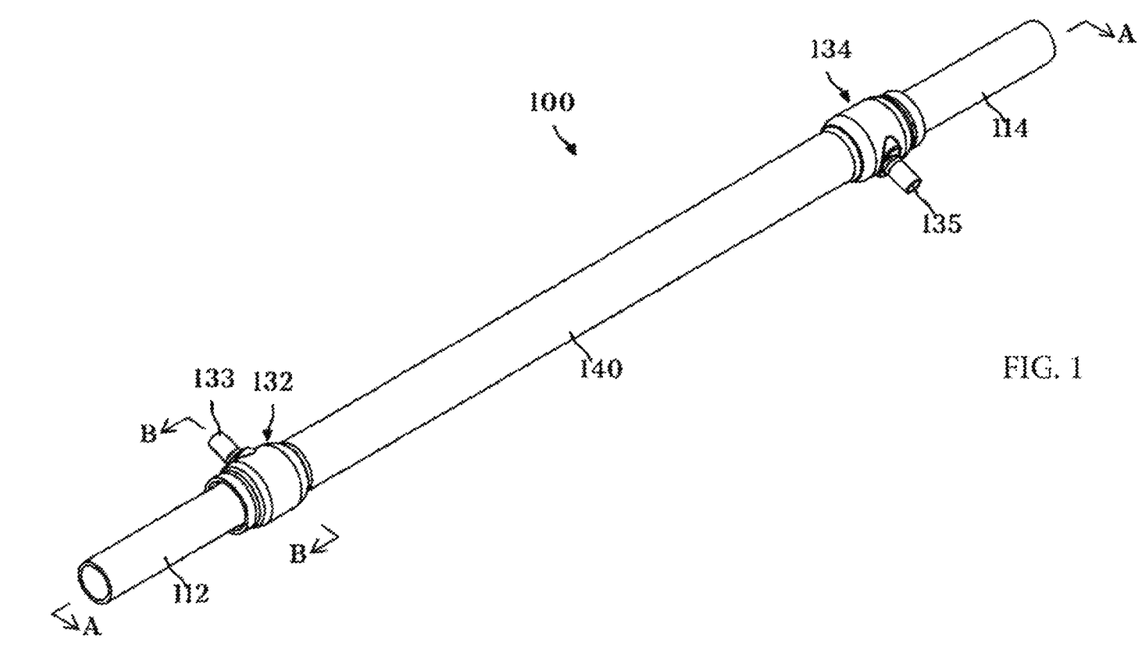
FIG. 1 is a perspective view of a double tube for heat exchange according to an embodiment of the present invention.
Figure 2:
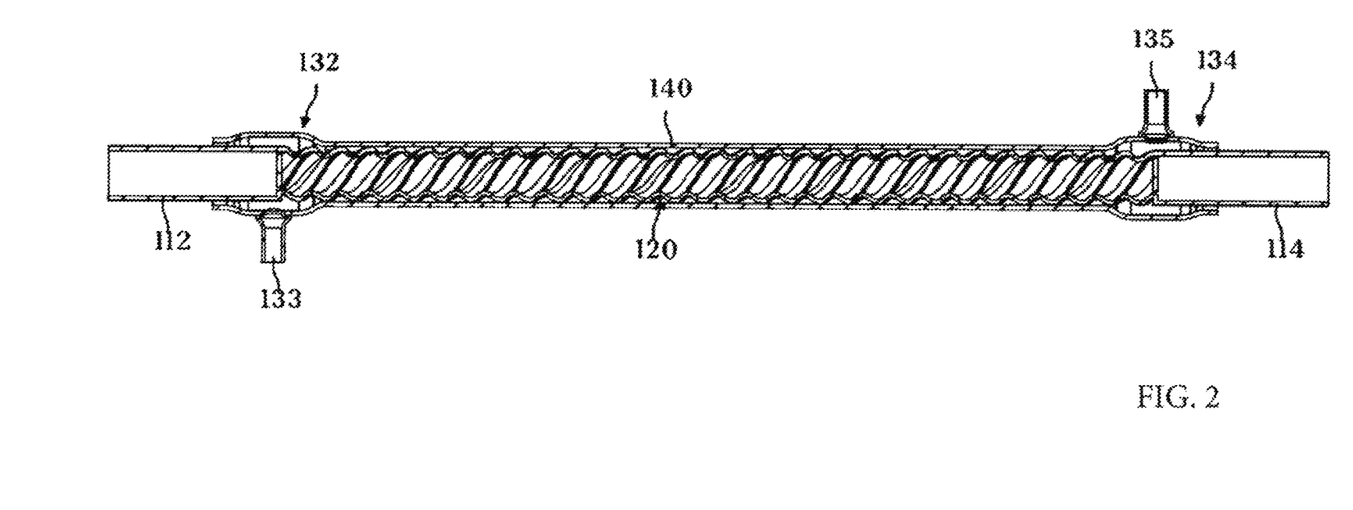
FIG. 2 is an exploded perspective view of the double tube for heat exchange according to an embodiment of the present invention.

FIG. 1 is a perspective view of a double tube for heat exchange according to an embodiment, and FIG. 2 is an exploded perspective view of the double tube for heat exchange according to an embodiment.

Figure 3:
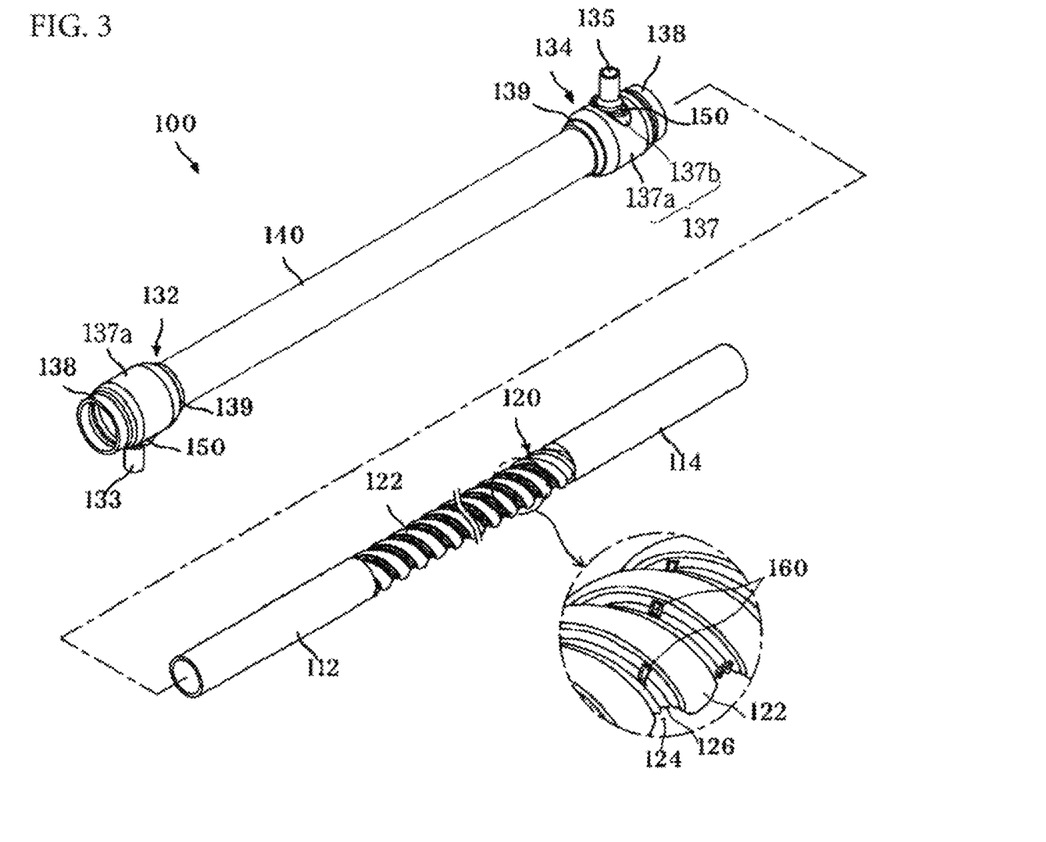
FIG. 3 is a sectional view taken along A-A line of FIG. 1.
Figure 4:
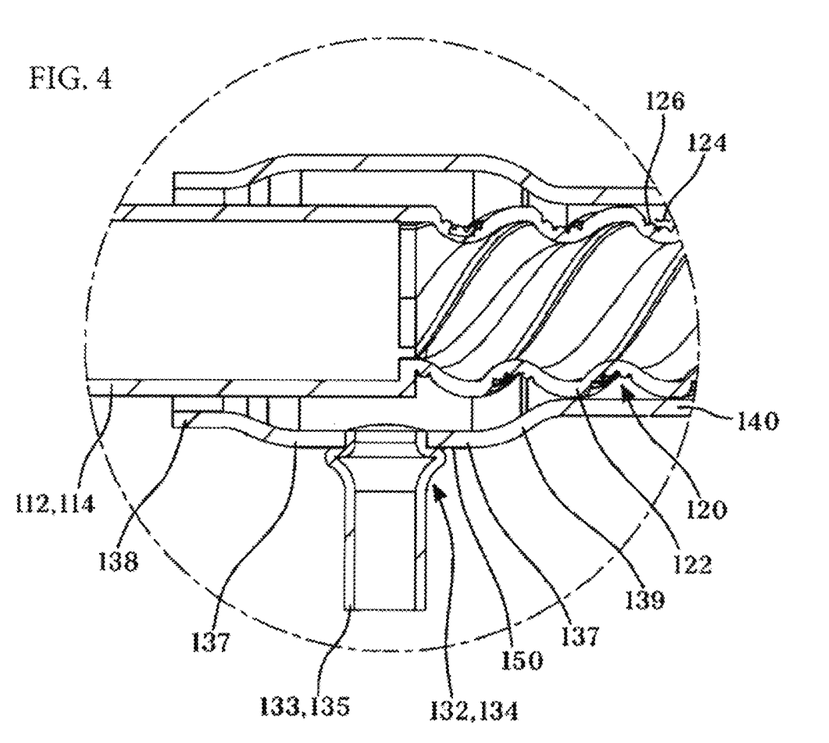
FIG. 4 is an enlarged view of a main section of FIG. 3.
Figure 5:
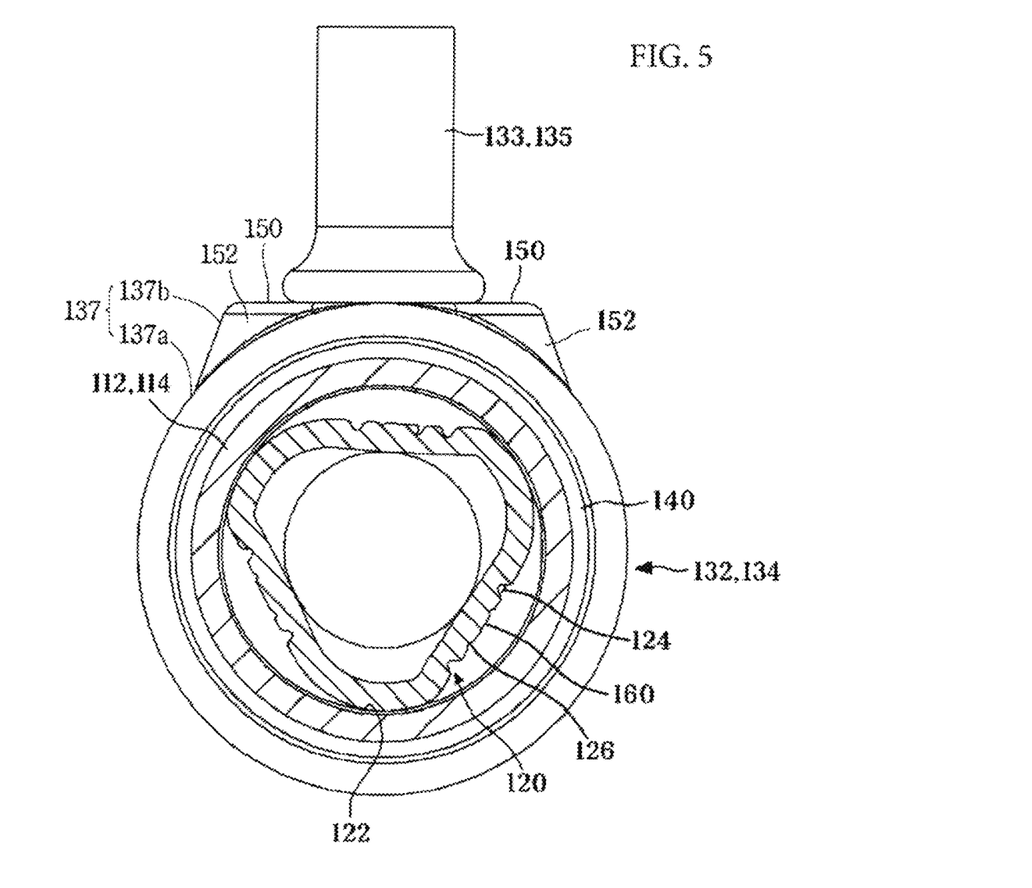
FIG. 5 is a sectional view taken along B-B line of FIG. 1.

FIG. 3 is a sectional view taken along A-A line of FIG. 1, FIG. 4 is an enlarged view of a main section of FIG. 3, and FIG. 5 is a sectional view taken along B-B line of FIG. 1.

Figure 6:
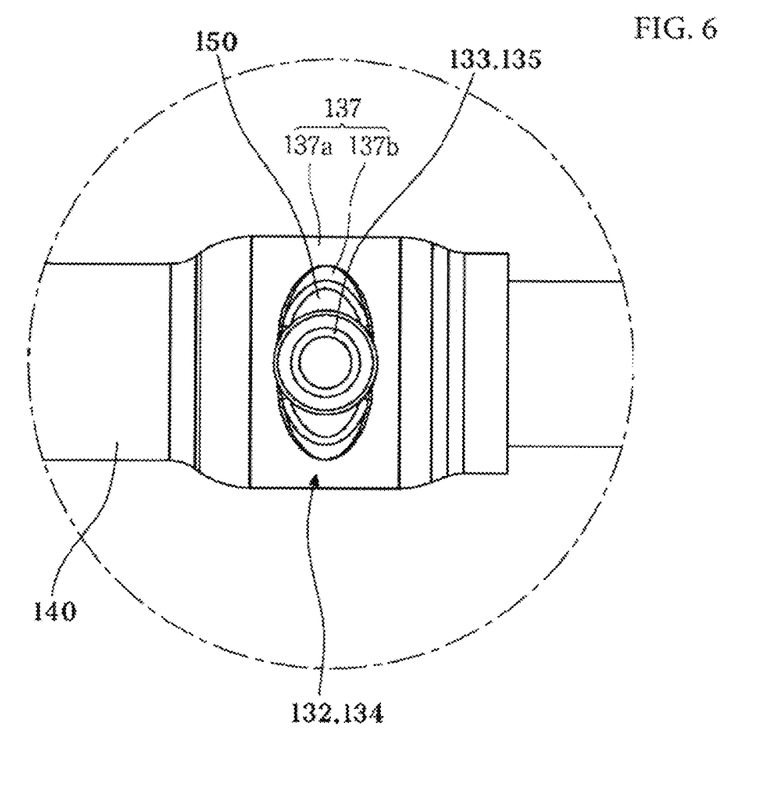
FIG. 6 is a plan view of a flattened upper surface according to an embodiment of the present invention.

FIG. 6 is a plan view of a flattened upper surface according to an embodiment.

Figure 7:
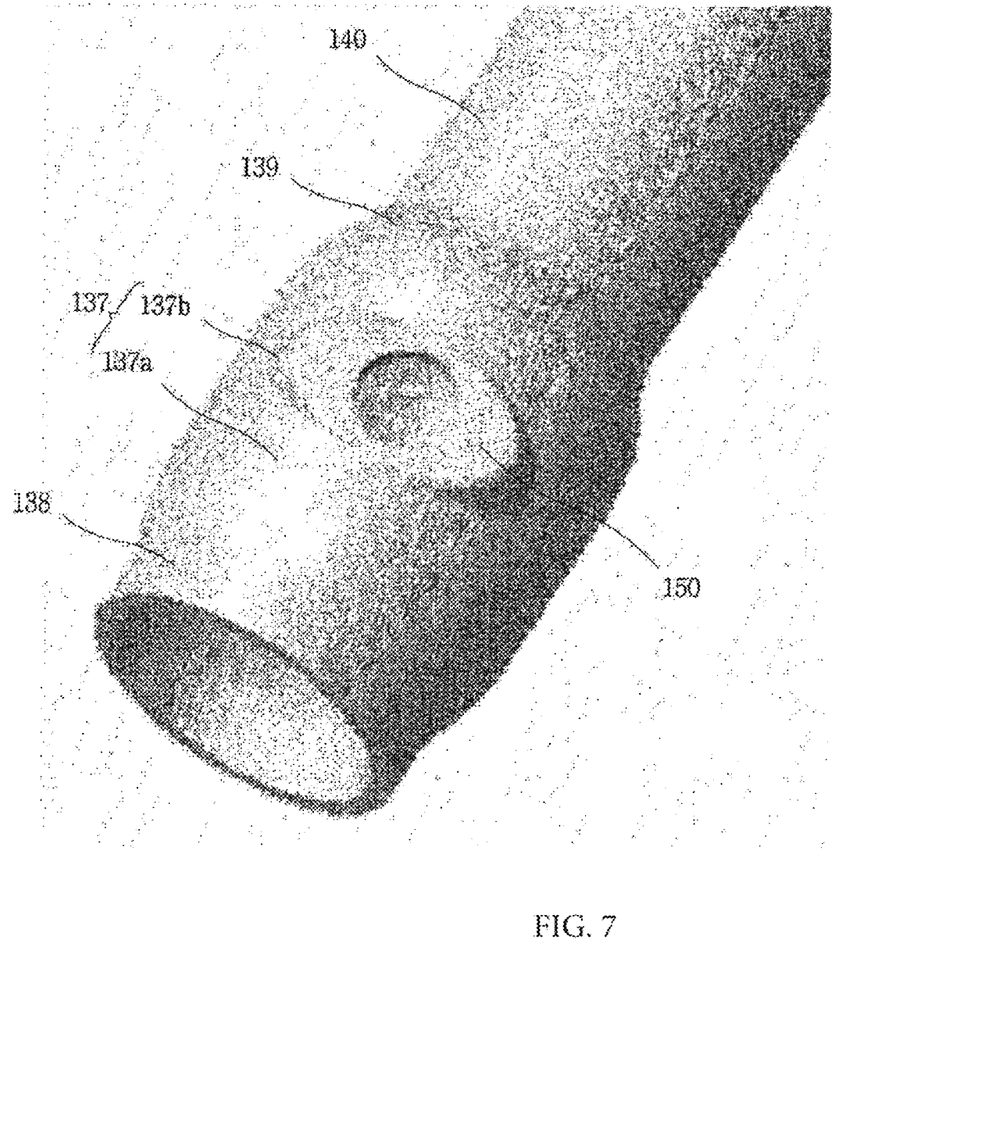
FIG. 7 is a perspective view of the flattened upper surface of FIG. 6.
Figure 8:
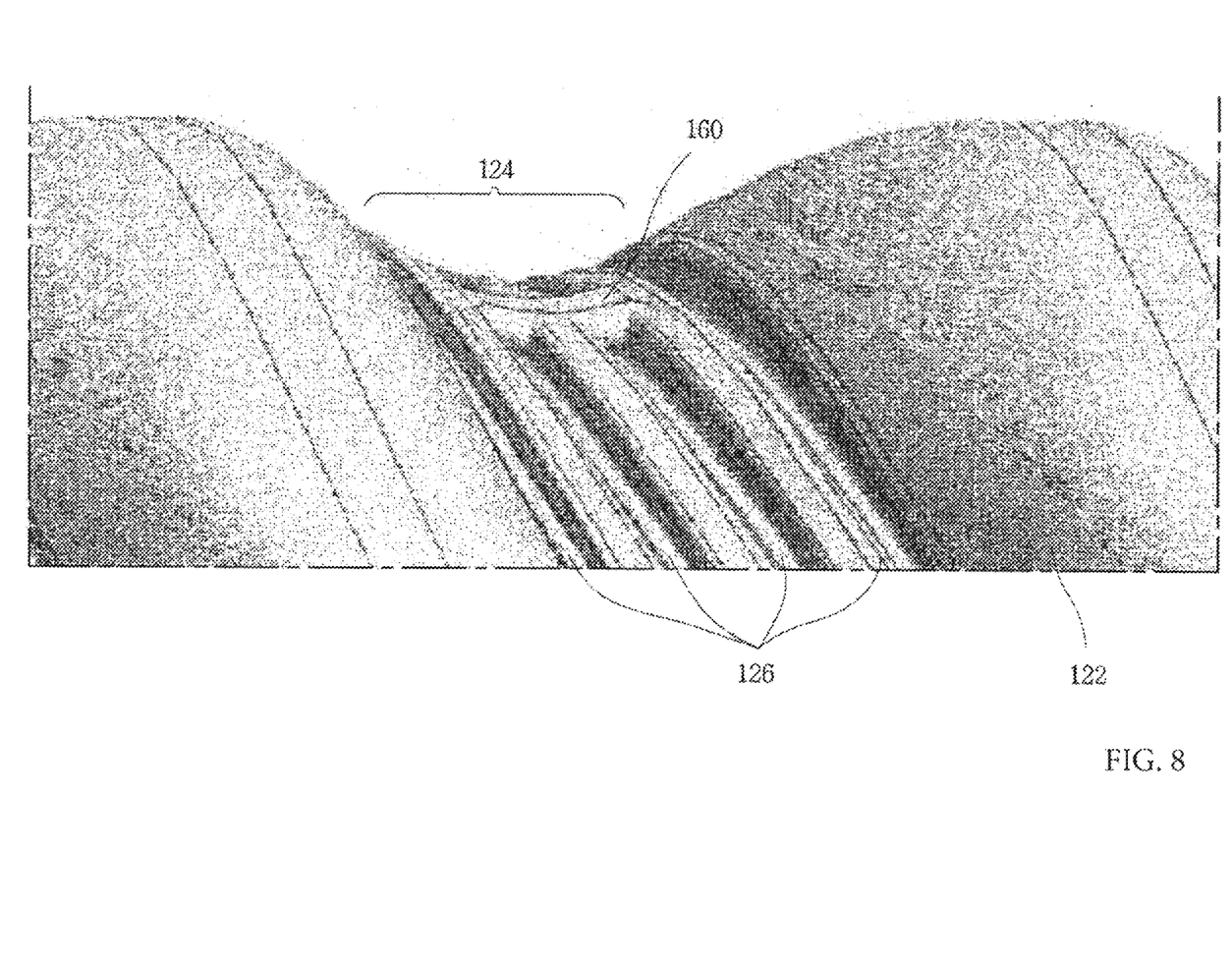
FIG. 8 is an enlarged view of a resistance member disclosed in FIG. 3.

FIG. 7 is a perspective view of the flattened upper surface of FIG. 6, and FIG. 8 is an enlarged view of a resistance member disclosed in FIG. 3.

Referring to FIGS. 1 to 8, a double tube for heat exchange 100 according to an embodiment includes inner pipes 112, 114, a spiral pipe 120, pipe expansion joints 132, 134, and an outer pipe 140.

The double tube for heat exchange 100 according to an aspect of the present invention allows heat exchange between a refrigerant (first fluid) at an outlet of an evaporator of an automotive air conditioner and a refrigerant (second fluid) at an outlet of a condenser of the air conditioner to reduce load of the compressor through increase in temperature of the first fluid introduced into a compressor, while improving vaporization efficiency through decrease in temperature of the second fluid introduced into an expansion valve.

Particularly, the outer pipe 140 has a tubular shape and allows a high-temperature and high-pressure fluid (the second fluid) at the outlet of the condenser to flow therethrough.

The inner pipes 112, 114 have a tubular shape, allow a low-temperature and low-pressure fluid (the first fluid) at the outlet of the evaporator to flow therethrough, and are inserted into the outer pipe 140.

Thus, the second fluid at high temperature and high pressure at the outlet of the condenser flows through a space between the inner pipes 112, 114 and the outer pipe 140.

That is, the double tube for heat exchange 100 according to an aspect of the present invention allows heat exchange between the first fluid at low temperature and low pressure at the outlet of the evaporator and the second fluid at high temperature and high pressure at the outlet of the condenser through the inner pipes 112, 114.

In addition, the spiral pipe 120 connects the inner pipes 112, 114 to each other and is formed on a circumferential surface thereof with ridges 122 and valleys 124 in an alternating manner along a spiral track thereof.

Further, the spiral pipe 120 is connected at opposite sides thereof to the inner pipes 112, 114. In other words, a first inner pipe 112 is connected to one side of the spiral pipe 120 and the second inner pipe 114 is connected to the other side of the spiral pipe 120. It should be understood that the spiral pipe 120 may be formed at a portion of the first inner pipe 112 or a portion of the second inner pipe 114. Thus, the first fluid flows through the first inner pipe 112, the spiral pipe 120, and the second inner pipe 114.

Particularly, the spiral pipe 120 is formed with the ridges 122 and the valleys 124 in an alternating manner. Since the second fluid flows along the valleys 124 of the circumferential surface of the spiral pipe 120, residence time of the second fluid in the outer pipe 140 and the spiral pipe 120 is increased, thereby improving heat exchange efficiency between the second fluid and the first fluid.

In addition, the ridges 122 of the spiral pipe 120 may consecutively adjoin an inner surface of the outer pipe 140. As a result, the second fluid is allowed to flow along the valleys 124 of the spiral pipe 120.

Here, the ridges 122 consecutively adjoin the inner surface of the outer pipe 140 such that the second fluid can stably flow in a particular direction.

The pipe expansion joints 132, 134 are placed at junctions between the inner pipes 112, 114 and the spiral pipe 120, respectively. The pipe expansion joints 132, 134 are sealed against a circumferential surface of the corresponding pipe of the inner pipes 112, 114 and are provided with ports 133, 135 for inflow/outflow of the second fluid, respectively.

In other words, a first pipe expansion joint 132 covers a junction between the first inner pipe 112 and the spiral pipe 120, and a second pipe expansion joint 134 covers a junction between the second inner pipe 114 and the spiral pipe 120.

The first pipe expansion joint 132 is sealed along a circumferential surface of the first inner pipe 112 by welding and the like. The second pipe expansion joint 134 is sealed along a circumferential surface of the second inner pipe 114 by welding and the like.

The first pipe expansion joint 132 and the second pipe expansion joint 134 are connected to the outer pipe 140. Here, the outer pipe 140 may be integrally formed with the first pipe expansion joint 132 at one side thereof and be integrally formed with the second pipe expansion joint 134 at the other side thereof.

It should be understood that the first pipe expansion joint 132 and the second pipe expansion joint 134 may also be connected to the outer pipe 140 by welding and the like.

As such, the outer pipe 140 is configured to surround the entire spiral pipe 120.

In addition, the first pipe expansion joint 132 has a first port 133 for receiving the second fluid at high temperature and high pressure from the outlet of the condenser, and the second pipe expansion joint 134 has a second port 135 for discharging the heat exchanged second fluid to the expansion valve.

Thus, the second fluid introduced through the first port 133 flows along the valleys 124 in a space between the outer pipe 140 and the spiral pipe 120 and is then discharged through the second port 135.

Here, the second fluid exchanges heat with the first fluid that flows along the first inner pipe 112, the spiral pipe 120, and the second inner pipe 114. That is, the first fluid is heated through heat exchange with the second fluid, and the second fluid is cooled through heat exchange with the first fluid.

Thus, the inner pipes 112, 114, the spiral pipe 120, and the outer pipe 140 may be formed of a material having high thermal conductivity.

The first pipe expansion joint 132 and the second pipe expansion joint 134 have the same shape to be interchangeable with each other. Here, each of the first pipe expansion joint 132 and the second pipe expansion joint 134 includes a pipe expansion portion 137, a packing member 138, and a connection member 139.

The pipe expansion portion 137 has a greater diameter than the outer pipe 140 so as to reduce flow noise of the second fluid. Here, the pipe expansion portions 137 are configured to surround a junction between the first inner pipe 112 and the spiral pipe 120 and a junction between the second inner pipe 114 and the spiral pipe 120, respectively. It should be understood that the pipe expansion portions 137 may also be placed at both sides in an axial direction of the spiral pipe 120.

In addition, the pipe expansion portion 137 has a greater diameter than the outer pipe 140.

That is, a space between the pipe expansion portion 137 and the spiral pipe 120 is expanded, whereby the transfer pressure and transfer rate of the second fluid can be reduced when the second fluid is introduced through the first port 133 of the pipe expansion portion 137, thereby reducing flow-induced noise.

In addition, since the space between the pipe expansion portion 137 and the spiral pipe 120 is expanded, transient storage capacity for the second fluid is increased just before the second fluid is discharged through the second port 135 of the pipe expansion portion 137, thereby stably securing a sufficient discharge amount.

The pipe expansion portion 137 may include a first pipe expansion portion 137a and a second pipe expansion portion 137b protruding from the first pipe expansion portion 137a.

Further, the packing member 138 is tapered from one side of the first pipe expansion portion 137a and is connected to the circumferential surface of the corresponding pipe of the first inner pipe 112 and the second inner pipe 114 to be packed on the surface. Particularly, since the packing member 138 is downwardly tapered from the first pipe expansion portion 137a, flow resistance of the second fluid can be reduced, thereby reducing flow-induced noise.

Moreover, the connection member 139 is tapered from the other side of the first pipe expansion portion 137a and connected to the outer pipe 140. Here, the connection member 139 is sealed at an edge thereof against a corresponding edge of the outer pipe 140 by welding and the like. Since the connection member 139 is downwardly tapered from the first pipe expansion portion 137a, flow resistance of the second fluid can be reduced, thereby reducing flow-induced noise.

As described above, thee second fluid stably flows along the valleys 124 in a particular direction. In order to allow the second fluid to flow more stably, each of the valleys 124 is provided with at least three grooves, preferably at least four grooves 126 along a spiral track of the valley 124.

Particularly, a plurality of grooves 126 is formed to be parallel to one another in order to improve flow directionality of the second fluid while increasing a contact area between the second fluid and the spiral pipe 120.

Here, the grooves 126 are not particularly limited in terms of shape, number, and height.

By a flattening process, the second expansion portion 137b of each of the pipe expansion joints 132, 134 may be formed with a flattened upper surface 150 at a portion of the curved circumferential surface thereof at which the corresponding pipe of the first port 133 and the second port 135 is formed.

The flattened upper surface 150 is formed by flattening the circumferential surfaces of the pipe expansion joints 132, 134 along the peripheries of the first port 133 and the second port 135 such that the first port 133 and the second port 135 can be easily coupled to the pipe expansion joints 132, 134, respectively, by welding and the like.

In other words, the first port 133 and the second port 135 may be partially inserted into the corresponding pipe of the pipe expansion joints 132, 134 and then welded by two-dimensionally moving a welding jig (not shown) on the flattened upper surface 150, thereby allowing easy welding while preventing welding defects.

By providing the flattened upper surface 150, a space expansion portion 152 can be naturally created inside the second pipe expansion portion 137b. It should be understood that the space expansion portion 152 may also be separately formed in an inner surface of each of the pipe expansion joints 132, 134.

The space expansion portion 152 can further reduce flow resistance of the second fluid, thus reducing flow-induced noise. It should be understood that the flattened upper surface 150 may be machined using various jigs.

That is, the second pipe expansion portion 137b can create the space expansion portion 152 inside the second pipe expansion portion 137b by flattening the circumferential surfaces of the pipe expansion joints 132, 134, and the first port 133 and the second port 135 can be welded on the flattened upper surface 150 along the peripheries of the first port 133 and the second port 135, thereby allowing easy welding while preventing welding defects. Heat exchange performance can be controlled by increasing/reducing the pitch between adjacent valleys 124 or between adjacent ridges 122 of the spiral pipe 120.

Particularly, as the number of grooves 126 of the valley 124 is increased, the distance between the ridge 122 and the outer pipe 140 decreases or the width of the ridge 122 increases in the circumferential direction of the outer pipe 140, thereby reducing flow-induced noise.

As the distance between the ridge portion 122 and the outer pipe 140 or the width of the ridge portion 122 is increased, noise reduction is further improved. However, increase in width of the ridge 122 with increasing distance between the ridge 122 and the outer pipe 140 can cause increased pressure loss in a flow path or re-expansion of the second fluid when the second fluid at high temperature and high pressure flows through the valleys 124. Thus, it is necessary to appropriately adjust a ratio of a sectional area of a flow path for the second fluid to the distance between the ridge portion 122 and the outer pipe.

In addition, a resistance member 160 may protrude from the valley 124. The resistance member 160 protrudes between adjacent ridges 122 and is not limited in terms of shape and number.

The resistance member 160 serves to increase the residence time of the second fluid in the valleys 124 while supporting the ridges 122 adjacent thereto.

It should be understood that the distance of adjacent resistance members 160 is not particularly limited.

Here, the spiral pipe 120 is formed with the valleys 124 and the grooves 126 along the spiral track thereof in a discontinuous manner such that the resistance members 160 can be naturally formed. Particularly, the resistance member 160 needs to have a smaller height than the ridge portion 122 to allow flow of the second fluid.

Thus, the resistance member 160 may be partially chamfered at an upper portion thereof. It should be understood that the resistance member 160 may be formed in various shapes.

Although some embodiments have been described herein, it should be understood that these embodiments are provided for illustration only and are not to be construed in any way as limiting the present invention, and that various modifications, changes, and alterations can be made by those skilled in the art without departing from the spirit and scope of the invention.

It is understood that the foregoing description is that of the preferred embodiments of the invention and that various changes and modifications may be made thereto without departing from the spirit and scope of the invention as defined in the appended claims.

LIST OF REFERENCE NUMERALS

100 Double tube 112, 114: First and second inner pipes
120 Spiral pipe 122: Ridge portion
124 Valley 126: Groove
132, 134 First and second pipe expansion joints
133,135 First and second ports 137: Pipe expansion portion
137a, 137b First and second pipe expansion portions
138 Packing member 139: Connection member
140 Outer pipe 150: Flattened upper surface
152 Space expansion portion 160: Resistance member

The invention claimed is:

1. A double tube for heat exchange, comprising:
a spiral pipe having a circumferential surface and defining a spiral track;
said spiral pipe having ridges and valleys alternately formed on said circumferential surface along said spiral track and being configured to guide a first fluid to flow therethrough;
an outer pipe having said spiral pipe axially inserted thereinto and configured to guide a second fluid to flow along said circumferential surface of said spiral pipe in an axial direction such that the second fluid exchanges heat with the first fluid;
said spiral pipe having two ends;
a first inner pipe;
a second inner pipe;
said first inner pipe and said second inner pipe being connected to opposite ones of said two ends of said spiral pipe so as to allow the first fluid to flow therethrough;
said outer pipe having a first outer pipe end and a second outer pipe end;
a first pipe expansion joint provided at said first outer pipe end;
a second pipe expansion joint provided at said second outer pipe end;
said first and second pipe expansion joints having a greater diameter than said outer pipe at junctions of said spiral pipe and said inner pipes;
said first and second pipe expansion joints being sealed against the corresponding ones of said first inner pipe and said second inner pipe and provided with ports for introducing and discharging the second fluid, respectively;
each of said first pipe expansion joint and said second pipe expansion joint including pipe expansion portions having a greater diameter than said outer pipe and being integrally connected to said outer pipe;
wherein said pipe expansion portions each include a first pipe expansion portion and a second pipe expansion portion protruding from said first pipe expansion portion and having a flattened upper surface;
wherein said ports are welded on the flattened upper surface of said second pipe expansion portions along the peripheries of said ports;
a resistance member protruding from said valleys so as to increase a residence time of the second fluid in said valleys;
each of said valleys has at least three grooves formed along said spiral track;
said at least three grooves include two outer grooves; and,
said resistance member is at least partially formed over said at least three grooves except for said two outer grooves.

2. The double tube for heat exchange of claim 1, wherein said first inner pipe and said second inner pipe each have a circumferential inner pipe surface, and, said first pipe expansion joint and said second pipe expansion joint each further include:
a packing member tapered from one side of the corresponding pipe expansion portion and connected to said circumferential inner pipe surface of the corresponding one of said first inner pipe and said second inner pipe to be packed on the surface; and,
a connection member tapered from the other side of the corresponding pipe expansion portion and integrally connected to said outer pipe.

3. The double tube for heat exchange of claim 1, wherein:
each of said valleys has at least four grooves formed along said spiral track;
said at least four grooves include said two outer grooves; and,
said resistance member is at least partially formed over said at least four grooves except for said two outer grooves.

4. A double tube for heat exchange comprising:
a spiral pipe having a circumferential surface and defining a spiral track;
said spiral pipe having ridges and valleys alternately formed on said circumferential surface along said spiral track and being configured to guide a first fluid to flow therethrough;
an outer pipe;
said outer pipe having said spiral pipe axially inserted thereinto and being configured to guide a second fluid to flow along said circumferential surface of said spiral pipe in an axial direction such that the second fluid exchanges heat with the first fluid;
said spiral pipe having two ends;
a first inner pipe;
a second inner pipe;
said first inner pipe and said second inner pipe being connected to opposite ones of said two ends of said spiral pipe so as to allow the first fluid to flow therethrough;
said outer pipe having a first outer pipe end and a second outer pipe end;
a first pipe expansion joint connected to said first outer pipe end;
a second expansion joint connected to said second outer pipe end;
said first and said second pipe expansion joints having a greater diameter than said outer pipe at junctions of said spiral pipe and said first and second inner pipes;
said first expansion joint and second pipe expansion joint each being sealed against the corresponding one of said first and second inner pipes;
said first expansion joint and said second expansion joint each being provided with a port for introducing and discharging the second fluid, respectively;
said first pipe expansion joint and said second pipe expansion joint including pipe expansion portions having a greater diameter than said outer pipe and integrally connected to said outer pipe;
each of said valleys having at least three grooves formed along said spiral track;
said at least three grooves including two outer grooves; and,
a resistance member protruding at least partially over said at least three grooves except for said two outer grooves.

5. The double tube for heat exchange of claim 4, wherein:
each of said valleys has at least four grooves formed along said spiral track; and,
said resistance member is at least partially formed over said at least four grooves except for said two outer grooves.

6. The double tube for heat exchange of claim 4, wherein said first inner pipe and said second inner pipe each have a circumferential inner pipe surface, and, said first pipe expansion joint and said second pipe expansion joint each further include:
a packing member tapered from one side of the corresponding pipe expansion portion and connected to said circumferential inner pipe surface of the corresponding one of said first inner pipe and said second inner pipe to be packed on the surface; and,
a connection member tapered from the other side of the corresponding pipe expansion portion and integrally connected to said outer pipe.

7. The double tube heat exchanger of claim 4, the resistance member is partially chamfered at an upper portion thereof.

8. The double tube heat exchanger of claim 4, the resistance member protrudes from a valley of said valleys.

* * * * *